Sept. 10, 1940. L. A. WARD 2,214,290

BALL VALVE

Filed Oct. 24, 1938

Inventor
LOYD A. WARD
By Beaman & Langford
Attorney

Patented Sept. 10, 1940

2,214,290

UNITED STATES PATENT OFFICE 2,214,290

BALL VALVE

Loyd A. Ward, Jackson, Mich., assignor to Tomkins-Johnson Company, Jackson, Mich., a corporation of Michigan Application October 24, 1938, Serial No. 236,680

1 Claim. (Cl. 251—120).

This invention relates to fluid valves and more particularly to valves for providing different rates of flow of fluid passing therethrough, depending on the direction of flow.

In certain fluid systems it is sometimes advisable to provide for the flow of fluid at different rates, depending on the direction of flow. Such a case might be where a single conduit is used in a fluid motor for conducting both power and exhaust fluids. The present invention provides a valve for obtaining a differential rate of flow, depending on the direction, by the use of a resiliently closed valve in combination with a by-pass of restricted size around the valve.

An object of the present invention is to provide a valve for insertion in a conduit for permitting one rate of flow of fluid in one direction and another rate of flow of fluid in the opposite direction.

Another object of the invention is to provide a resiliently closed valve with a restricted by-pass therearound.

A further object of the invention is to provide a spring pressed ball valve continuously urged against a seat in combination with a by-pass past the seat.

Figure 1:
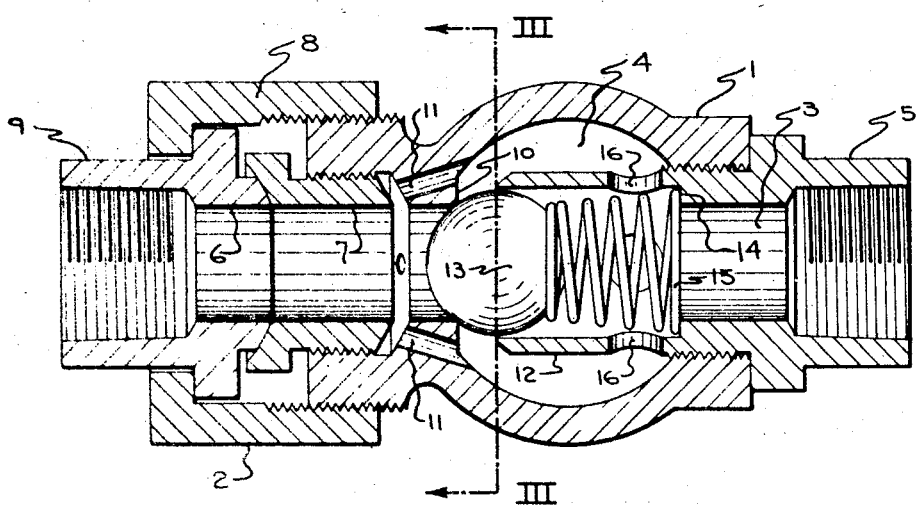
Figure 2:
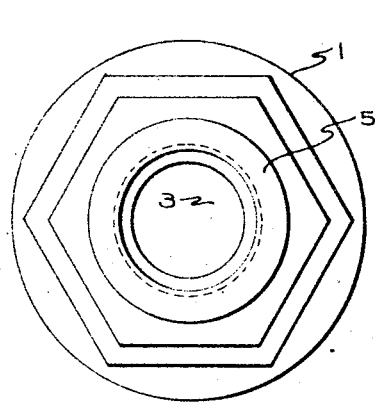
Figure 3:
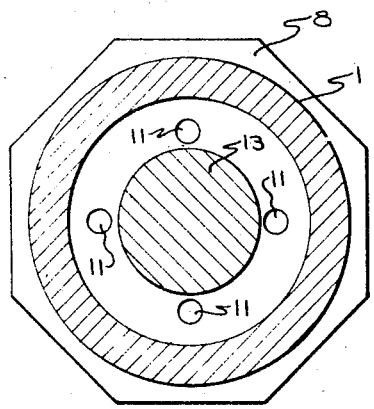

These and other objects will be apparent from the following specification when taken with the accompanying drawing, in which Fig. 1 is a vertical section through the valve comprising the present invention, Fig. 2 is an end view thereof, and Fig. 3 is a section on the line III—III of Fig. 1.

Referring particularly to the drawing, the reference character 1 indicates a body at one end of which is arranged a coupling 2. The body 1 is provided with a straight through passage 3 intermediate the ends of which is a chamber 4. At the right end of the body 1, as shown in Fig. 1, is a pipe connection 5. At the left end of the body 1, as shown in Fig. 1, the coupling 2 is secured and comprises seating members 6 and 7. The seating member 7 is threaded into the body 1. Seating members 6 and 7 are clamped together by a coupling ring 8. Integral with the seating member 6 is a pipe connection 9.

At one end of the chamber 1 is provided a valve seat 10 having spaced therearound, as shown particularly in Figs. 1 and 3, a plurality of restricted by-pass ports 11. Projecting from the opposite end of the chamber 4 and integral with the pipe connection 5 is a tubular member 12, which is centrally disposed within the chamber 4 and comprises a part of the passage 3. The outer end of the tube 12 is adjacent the seat 10 and has disposed therein a ball valve member 13 for seating against the seat 10. Within the tube 12 is a shoulder 14 against which bears one end of a helical spring 15. The opposite end of the spring 15 bears against the ball valve member 13 and resiliently urges the same against the seat 10. As shown particularly in Fig. 1, the tubular member 12 is provided with a plurality of circumferentially arranged openings 16.

In operation of the valve according to the present invention, when the fluid passing therethrough passes from left to right, as viewed in Fig. 1, the fluid not only passes through the by-pass ports 11, but also forces the ball valve member 13 from its seat against the action of the spring 15, permitting a direct flow of fluid. Substantially all of the fluid passing the seat 10, either through the by-pass ports 11 or past the ball valve member 13, passes through the chamber 4 and returns to the passage 3 through the openings 16 in the tubular member 12. When the fluid passes through the valve from right to left, as viewed in Fig. 1, the ball valve member 13 is closed under the action of the spring 15, and the only fluid passing the valve passes through the restricted by-pass ports 11. It will be understood that the cross-sectional area of the by-pass ports 11 is considerably less than that of the passage 3 so that when the fluid is passing from right to left, as viewed in Fig. 1, the flow thereof is considerably less than the passage of the fluid from left to right when the ball valve member 13 is moved from its seat 10.

It will be understood that, while I prefer the construction disclosed because it provides a substantially straight through or stream-lined flow of fluid, the present invention is not necessarily limited to the spring and ball check valve, but that other types of check valves may be used. It will be further understood that where a valve is arranged in other positions than horizontal, gravity may be employed to take place of the spring 15. Furthermore, instead of using the by-pass ports 11 to by-pass fluid by the ball valve member 13, the seat 10 may have its surface scored, as shown in Patent No. 851,999, for instance.

Having thus described my invention, what I desire to secure by Letters Patent and claim is:

A valve comprising a body, a passage therethrough, said passage having intermediate its ends a chamber, a cylindrical tube communicating with said passage projecting into said chamber from one end thereof, a valve seat at the other end of said chamber, said tube terminating adjacent said valve seat, a ball valve disposed in said tube, a spring seat adjacent the end of said tube away from said valve seat, and a spring between and bearing against said spring seat and said ball valve to urge said ball valve against said valve seat, said tube having perforations therein between said spring seat and said valve seat, and said body having a plurality of leakage ports past said valve seat comprising a by-pass around said ball valve when the same is on said valve seat.

LOYD A. WARD.